United States Patent
Guo et al.

(10) Patent No.: US 12,117,813 B2
(45) Date of Patent: Oct. 15, 2024

(54) COMPONENT INSPECTION SYSTEM AND METHOD

(71) Applicant: Pratt & Whitney Canada Corp., Longueuil (CA)

(72) Inventors: Changsheng Guo, South Windsor, CT (US); Clément Drouin Laberge, Terrebonne (CA); Daniel Hayek, Pickering (CA); Samuel S. Yang, West Hartford, CT (US); Maxime Lebrun, Saint-Hubert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 263 days.

(21) Appl. No.: 17/497,504

(22) Filed: Oct. 8, 2021

(65) Prior Publication Data
US 2023/0111750 A1 Apr. 13, 2023

(51) Int. Cl.
*G05B 19/418* (2006.01)
(52) U.S. Cl.
CPC .......... *G05B 19/41875* (2013.01); *G05B 2219/32196* (2013.01); *G05B 2219/35134* (2013.01)
(58) Field of Classification Search
CPC .... G05B 19/41875; G05B 2219/32196; G05B 2219/35134; G05B 2219/37443;
(Continued)

(56) References Cited

U.S. PATENT DOCUMENTS

| 5,465,221 A | 11/1995 | Merat |
| 10,025,289 B2 | 7/2018 | Blais |

(Continued)

FOREIGN PATENT DOCUMENTS

| CN | 104701211 A | * | 6/2015 |
| CN | 112801524 A | * | 5/2021 |

(Continued)

OTHER PUBLICATIONS

Zhao et al., "Computer-Aided Inspection Planning—The state of the art", Computers in Industry, Elsevier, Amsterdam, NL, vol. 60, No. 7, Sep. 1, 2009, pp. 453-466.

(Continued)

*Primary Examiner* — Thomas C Lee
*Assistant Examiner* — Michael Tang
(74) *Attorney, Agent, or Firm* — Getz Balich LLC

(57) ABSTRACT

A method for inspecting components includes providing a plurality of different three-dimensional component CAD models with each three-dimensional component CAD model of the plurality of different three-dimensional component CAD models sharing at least one common geometric feature. The method further includes generating an inspection sequence for the at least one common geometric feature, collecting feature manufacturing data for the at least one common geometric feature during manufacturing of a plurality of different components corresponding to the respective plurality of different three-dimensional component CAD models, analyzing the feature manufacturing data associated with the at least one common geometric feature, modifying the inspection sequence for the at least one common geometric feature based on the analyzed feature manufacturing data, and inspecting components based on the modified inspection sequence.

20 Claims, 7 Drawing Sheets

(58) Field of Classification Search
CPC . G05B 19/4097; G06F 2119/18; G06F 30/17; Y02P 90/02
USPC .................................. 700/98, 109; 702/179
See application file for complete search history.

(56) References Cited

U.S. PATENT DOCUMENTS

| | | | |
|---|---|---|---|
| 11,045,842 B2 | 6/2021 | Nygaard | |
| 2012/0253874 A1 * | 10/2012 | Harsh | G06Q 10/06395 |
| | | | 705/7.15 |

FOREIGN PATENT DOCUMENTS

| | | | | |
|---|---|---|---|---|
| JP | 2006157029 A | * | 6/2006 | ......... G05B 19/4184 |
| JP | 2012145551 A | * | 8/2012 | |
| WO | WO-2018204410 A1 | * | 11/2018 | |

OTHER PUBLICATIONS

EP Search Report for EP Application No. 22200669.4 dated Jun. 21, 2023.

* cited by examiner

COMPONENT INSPECTION SYSTEM AND METHOD

TECHNICAL FIELD

This disclosure relates generally to the inspection of manufactured components and more particularly to systems and methods for inspecting components.

BACKGROUND OF THE ART

For batch manufacturing of components, the rate of inspection or sampling of the components may be established in an inspection plan based on demonstrated process capability. For example, an inspection plan may call for inspecting 1 part for every 5 parts of a manufactured batch of parts. With the modern production demand, batch sizes have become smaller and smaller. In some cases, a single component may be manufactured for each batch of that component (e.g., a component having a particular part number). These small batch sizes can complicate inspection decisions and create a significant challenge for inspection. Under conventional inspection processes for small batch manufacturing, manufacturers may need to inspect all components of a batch if there is not a sufficient number of components to establish the desired inspection frequency of the inspection plan. For complex components with a large number of characteristics to inspect, this process of inspecting each component of a batch can be time consuming and can add significant cost to manufacturing.

SUMMARY

It should be understood that any or all of the features or embodiments described herein can be used or combined in any combination with each and every other feature or embodiment described herein unless expressly noted otherwise.

According to an aspect of the present disclosure, a method for inspecting components includes providing a plurality of different three-dimensional component CAD models with each three-dimensional component CAD model of the plurality of different three-dimensional component CAD models sharing at least one common geometric feature. The method further includes generating an inspection sequence for the at least one common geometric feature, collecting feature manufacturing data for the at least one common geometric feature during manufacturing of a plurality of different components corresponding to the respective plurality of different three-dimensional component CAD models, analyzing the feature manufacturing data associated with the at least one common geometric feature, and modifying the inspection sequence for the at least one common geometric feature based on the analyzed feature manufacturing data.

In any of the aspects or embodiments described above and herein, the at least one common geometric feature may include at least one geometric characteristic and the inspection sequence for the at least one common geometric feature may include measuring the at least one geometric characteristic.

In any of the aspects or embodiments described above and herein, the at least one geometric characteristic may include a dimension of the at least one common geometric feature.

In any of the aspects or embodiments described above and herein, the at least one common geometric feature may be a surface.

In any of the aspects or embodiments described above and herein, the inspection sequence may include an inspection frequency and a number of inspection measurements for the at least one common geometric feature.

In any of the aspects or embodiments described above and herein, the step of analyzing the feature manufacturing data may include determining one or both of a process capability (Cpk) and a process performance (Ppk) for the at least one common geometric feature.

In any of the aspects or embodiments described above and herein, the step of modifying the inspection sequence may include reducing the inspection frequency for the at least one common geometric feature when the one or both of the Cpk and the Ppk is greater than a predetermined threshold value.

In any of the aspects or embodiments described above and herein, the step of modifying the inspection sequence may include reducing the number of inspection measurements for the at least one common geometric feature when the one or both of the Cpk and the Ppk is greater than a predetermined value.

In any of the aspects or embodiments described above and herein, the method may further include indexing the at least one common geometric feature by assigning the at least one common geometric feature a unique identification code.

In any of the aspects or embodiments described above and herein, the method may further include storing the feature manufacturing data associated with the at least one common geometric feature as a dataset in a database and assigning the unique identification code to the dataset.

In any of the aspects or embodiments described above and herein, the feature manufacturing data may include an inspection history of the at least one common geometric feature.

According to another aspect of the present disclosure, a system for inspecting components includes a processor, a database in signal communication with the processor, and memory in signal communication with the processor. The memory contains instructions recorded therein which, when executed by the processor, cause the processor to: collect component manufacturing data for at least one common geometric feature during manufacturing of a component corresponding to a three-dimensional component CAD model which is one of a plurality of different three-dimensional component CAD models in the database sharing at least one common geometric feature, analyze the component manufacturing data, retrieve an inspection history of the at least one common geometric feature from the database, and determine whether at least one component geometric feature of the component, corresponding to the respective at least one common geometric feature, should be inspected based on the inspection history and the analyzed component manufacturing data.

In any of the aspects or embodiments described above and herein, analyzing the component manufacturing data may include determining whether the component manufacturing data includes an abnormal deviation.

In any of the aspects or embodiments described above and herein, the at least one common geometric feature may have a unique identification code.

In any of the aspects or embodiments described above and herein, the memory may contain instructions recorded therein which, when executed by the processor, may further cause the processor to store the component manufacturing data with feature manufacturing data which is stored as a dataset in the database. The feature manufacturing data may include the inspection history and the dataset may have the unique identification code.

In any of the aspects or embodiments described above and herein, the memory may contain instructions recorded therein which, when executed by the processor, may further cause the processor to compare the inspection history to an inspection sequence for the at least one common geometric feature.

According to another aspect of the present disclosure a method for inspecting components includes manufacturing a component corresponding to a three-dimensional component CAD model which is one of a plurality of different three-dimensional component CAD models sharing at least one common geometric feature, collecting component manufacturing data for the at least one common geometric feature during manufacturing of the component, analyzing the component manufacturing data, retrieving an inspection history of the at least one common geometric feature, and determining whether at least one component geometric feature of the component, corresponding to the respective at least one common geometric feature, should be inspected based on the inspection history and the analyzed component manufacturing data.

In any of the aspects or embodiments described above and herein, the step of analyzing the component manufacturing data may include determining whether the component manufacturing data includes an abnormal deviation.

In any of the aspects or embodiments described above and herein, the method may further include comparing the inspection history to an inspection sequence for the at least one common geometric feature.

In any of the aspects or embodiments described above and herein, the at least one common geometric feature may have a unique identification code and the method may further include storing the component manufacturing data with feature manufacturing data as a dataset in a database. The feature manufacturing data may include the inspection history and the dataset may have the unique identification code.

The present disclosure, and all its aspects, embodiments and advantages associated therewith will become more readily apparent in view of the detailed description provided below, including the accompanying drawings.

DETAILED DESCRIPTION

The present disclosure includes systems and methods for inspecting manufactured components. In particular, the systems and methods of the present disclosure provide a substantial improvement to component inspection processes for small batch and one-piece flow manufacturing of components.

Figure 1:
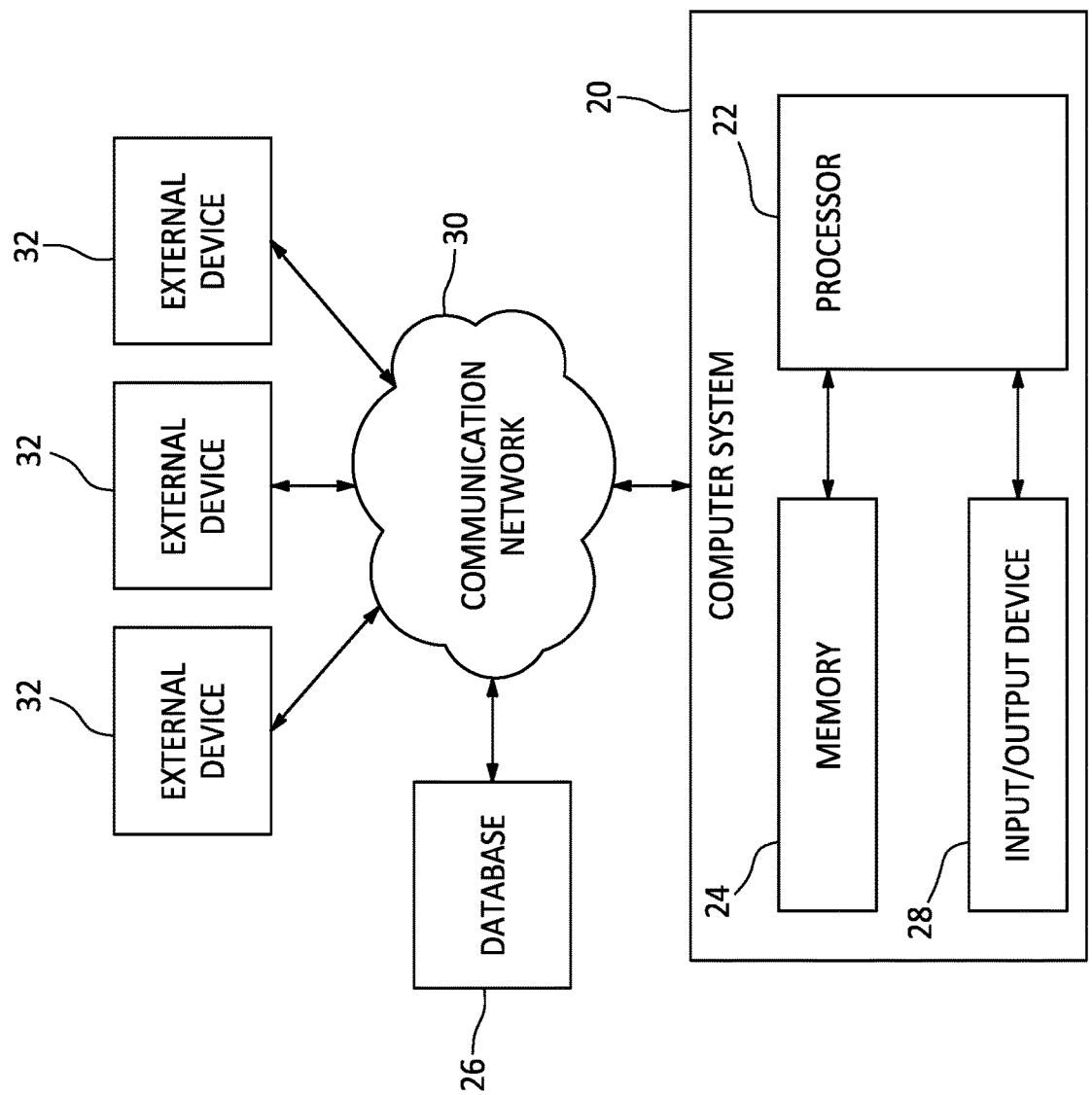
FIG. 1 illustrates a schematic block diagram of an exemplary computer system, in accordance with one or more embodiments of the present disclosure.

Referring to FIG. 1, a diagram of an exemplary computer system 20 is shown. The computer system 20 may be configured to implement one or more aspects of the present disclosure, however, the present disclosure is not limited to this particular computer system embodiment. The computer system 20 includes a processor 22 in signal communication with memory 24. The processor 22 may be any type of computing device, computational circuit, or processing circuit capable of executing a series of instructions that are stored in memory 24. The processor 22 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 24 may represent one or more algorithms for controlling the aspects of the computer system 20, and the stored instructions are not limited to any particular form (e.g., program files, system data, buffers, drivers, utilities, system programs, etc.) provided they can be executed by the processor 22. The memory 24 may be a non-transitory computer readable storage medium configured to store instructions that when executed by the processor 22, cause the processor 22 to perform or cause the performance of certain functions. The memory 24 may be a single memory device or a plurality of memory devices. A memory device may include a storage area network, network attached storage, as well as a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the computer system 20 may be achieved by the use of hardware, software, firmware, or any combination thereof.

In various embodiments, the computer system 20 may include a database 26 in signal communication with the processor 22. In various embodiments, the database 26 may be located external to the computer system 20 and in signal communication with the computer system 20 via any wired or wireless protocol. In various other embodiments, the database 26 may be integral to the computer system 20. For example, the database 26 may be integrated with the memory 24. In various embodiments, the computer system 20 may also include input (e.g., a keyboard, a touch screen, etc.) and output devices (e.g., a monitor, sensor readouts, data ports, etc.) (hereinafter input/output device 28), in signal communication with the processor 22, that enable a user to input instructions, receive data, etc.

The computer system 20 may be connected to a communication network 30. The communication network 30 may include any suitable electronic communication network or combination of electronic communication networks including, but not limited to, wired and/or wireless local area networks, internet-based networks, cloud-based storage and communication networks, and the like. The communication network 30 may allow remote electronic communications between the computer system 20 and one or more devices such as the database 26 and/or one or more external devices 32 including, for example, computer workstations, manufacturer-based computers such as computer-aided manufacturing (CAM) computers, manufacturing equipment such as additive manufacturing equipment, component casting equipment, and component scanning equipment, etc.

Figure 2:
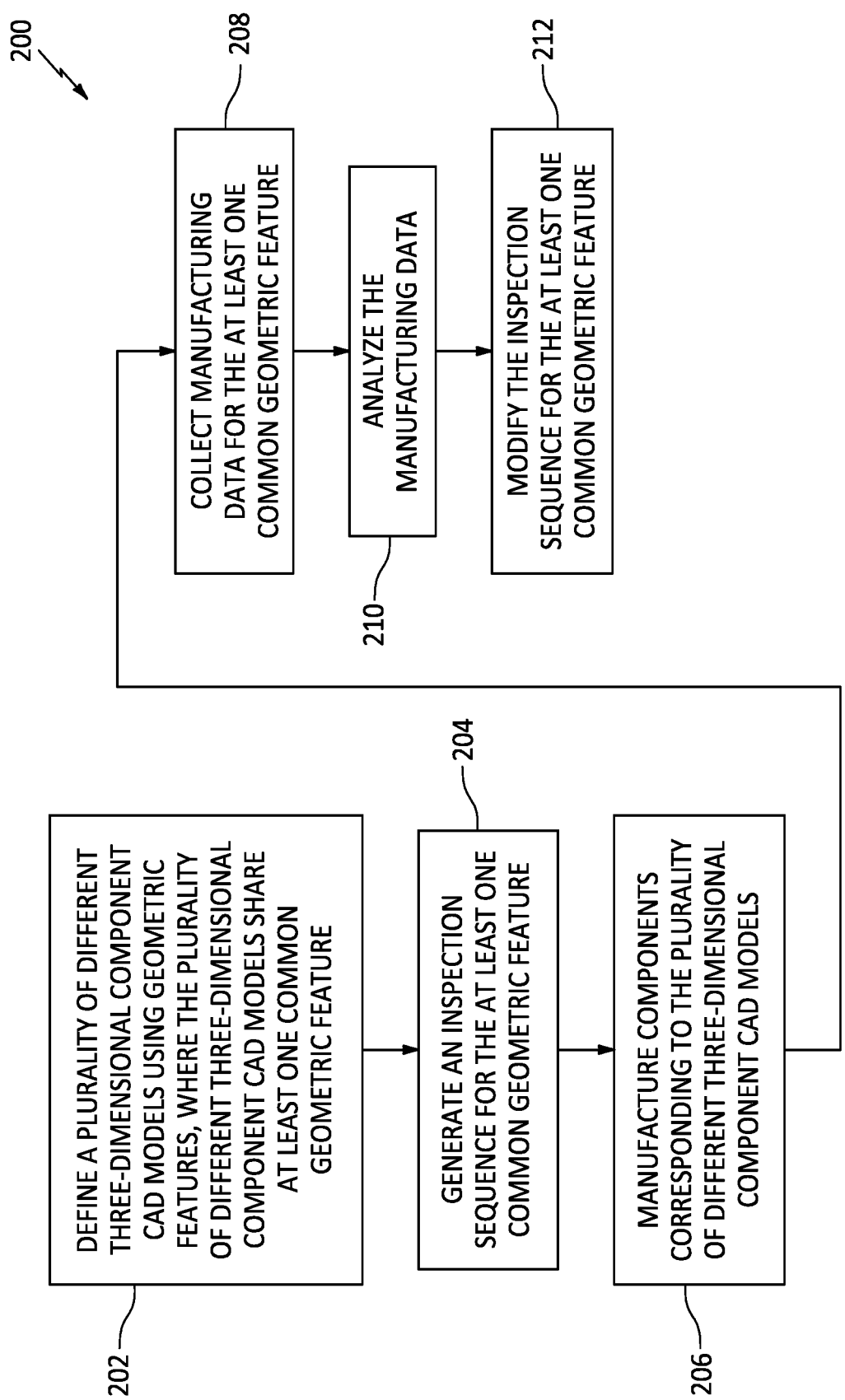
FIG. 2 illustrates a flowchart depicting a method for inspecting components, in accordance with one or more embodiments of the present disclosure.

Referring to FIGS. 1-2, the present disclosure includes a method 200 for inspecting components. For ease of description, the method 200 is described below with reference to the computer system 20 of FIG. 1. The method 200, however, may alternatively be performed with other computer system configurations. Unless otherwise noted herein, it should be understood that the steps of method 200 are not required to be performed in the specific sequence in which they are discussed below and, in various embodiments, the steps of method 200 may be performed separately or simultaneously. Further, it should be understood that not all of the steps of the method 200, discussed below, may be required unless otherwise described herein.

Figure 3:
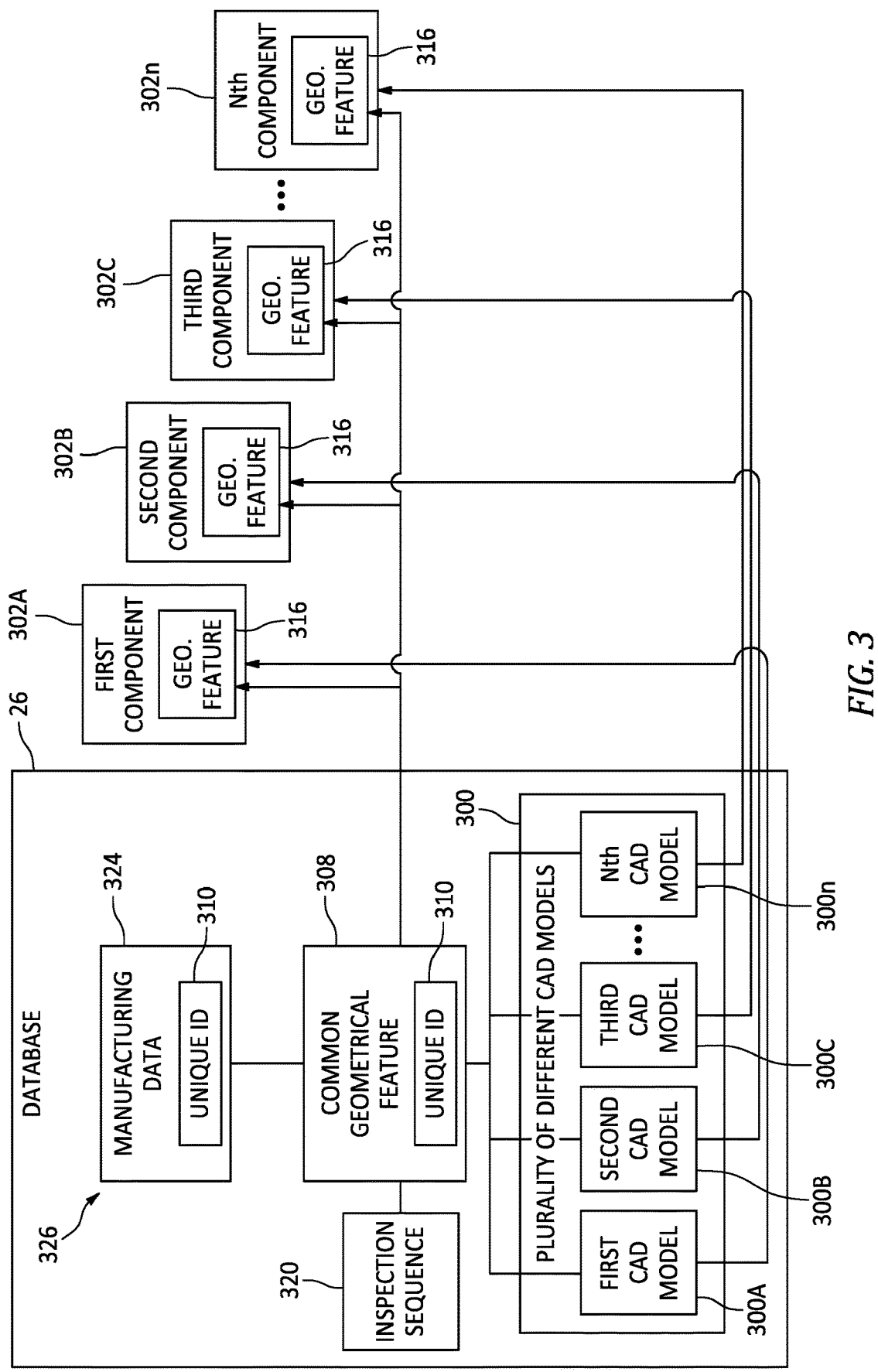
FIG. 3 illustrates a schematic block diagram including further details of the exemplary computer system of FIG. 1 and including associated manufactured components, in accordance with one or more embodiments of the present disclosure.

Referring to FIGS. 1-7, in some embodiments, the method 200 may include receiving or generating or otherwise defining a plurality of different three-dimensional component CAD models 300 (e.g., boundary definition models), corresponding to components 302A, 302B, 302C, . . . 302n intended for manufacture, with the computer system 20 using a suitable CAD system, platform, or software (which may also be referred to herein as a "CAD environment") (step 202). The present disclosure is not limited to any particular CAD system, platform, or software. The plurality of different three-dimensional component CAD models (hereinafter "plurality of different CAD models") may include any number of different CAD models 300A, 300B, 300C, . . . 300n and the present disclosure is not limited to any particular number of CAD models of the plurality of different CAD models. Each CAD model 300A-n of the plurality of different CAD models 300 may be defined by a plurality of geometric features including, for example, surfaces, edges, points, lines, planes, and volumes of the CAD model, as will be discussed in further detail. As used herein, the "plurality of different three-dimensional component CAD models" refers to a plurality of CAD models, such as CAD models 300A-n, in which at least one CAD model 300A-n may be different from at least one other component CAD model 300A-n, for example, based on a difference (e.g., different in size, shape, dimension, etc.) in at least one geometric feature. For further example, the plurality of CAD models 300 may include the first CAD model 300A corresponding to first component 302A, the second CAD model 300B corresponding to second component 302B, the third CAD model 300C corresponding to the third component 302C, etc. where each of the components 302A-n are intended to be different from one another, in their final manufactured form, based on at least one geometric feature of the components 302A-n. The plurality of different CAD models 300 may be stored in memory 24, the database 26 as shown in FIG. 3, or one or more external device 32 for use by the computer system 20. The CAD model 300 may be stored as a single file or as multiple files which are readable by compatible CAD software.

Figure 4:
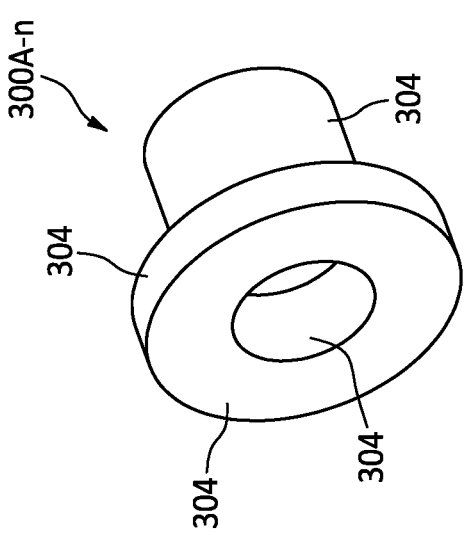
FIG. 4 illustrates a perspective view of a three-dimensional CAD model of an exemplary component, in accordance with one or more embodiments of the present disclosure.

FIG. 4 illustrates an exemplary CAD model 300A-n which includes a plurality of geometric features 304 defined in the exemplary CAD model 300A-n by a respective plurality of component surfaces. The plurality of geometric features 304 may be, for example, exterior and/or interior surfaces of the CAD model 300A-n for a modeled component. Accordingly, the CAD model 300A-n may include geometric features 304 of a modeled component which may be used for manufacturing and/or assembly of the modeled component. For ease of description, the geometric features 304 will be described herein with respect to surfaces, however, it should be understood that geometric features 304 according to the present disclosure may include other types of geometric features of the CAD model 300A-n, as described above.

Figure 5:
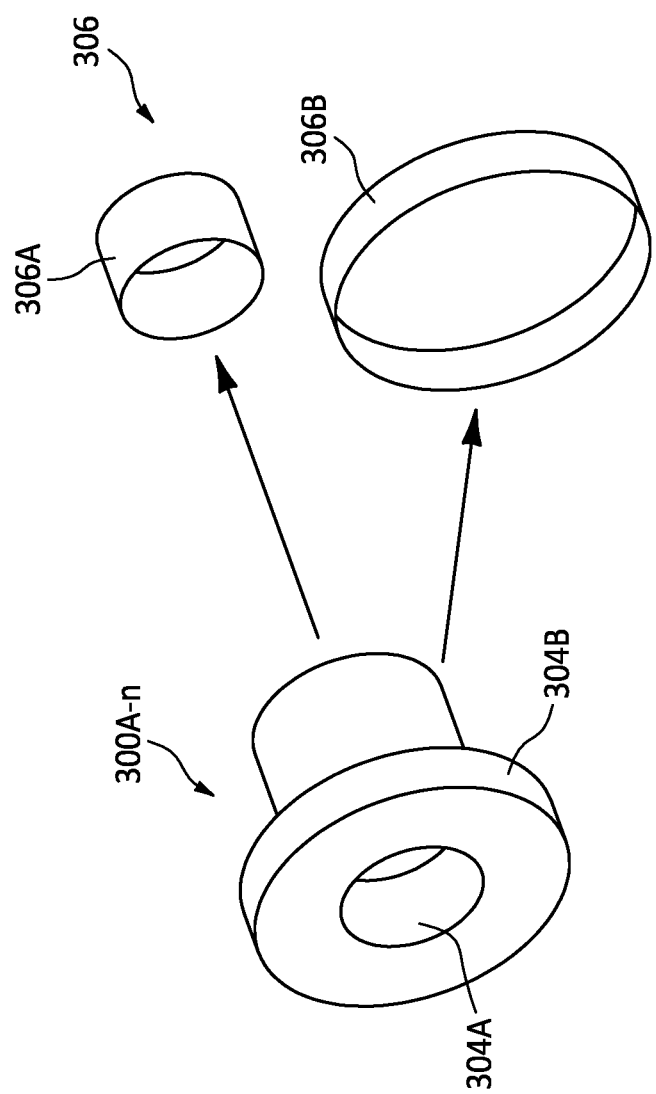
FIG. 5 illustrates perspective views of CAD-based surface representations extracted from surfaces of the CAD model of FIG. 4, in accordance with one or more embodiments of the present disclosure.

As shown in FIG. 5, in some embodiments, step 202 may include extracting surface information from each of the geometric features 304 of the CAD model 300A-n and generating CAD-based surface representations 306 of each of the geometric features 304 of the plurality of geometric features 304 of the CAD model 300A-n. The CAD-based surface representation 306 may be a three-dimensional surface representation as shown, for example, in FIG. 5, which illustrates a first surface representation 306A of a cylindrical surface extracted from a bore hole of the CAD model 300A-n. In one example of the present disclosure method 200, as illustrated in FIG. 5, step 202 may include generating the first surface representation 306A of a geometric feature 304A of the plurality of geometric features 304 of the CAD model 300A-n, generating a second surface representation 306B of a geometric feature 304B of the plurality of geometric features 304 which is different than the first geometric feature 304A. The surface representations 306 may be generated in the CAD environment and may be a unique CAD model which is independent of the CAD model 300A-n for a modeled component. In some embodiments, each surface representation 306 may be stored in the CAD environment, independent of the CAD model 300A-n.

Figure 6:
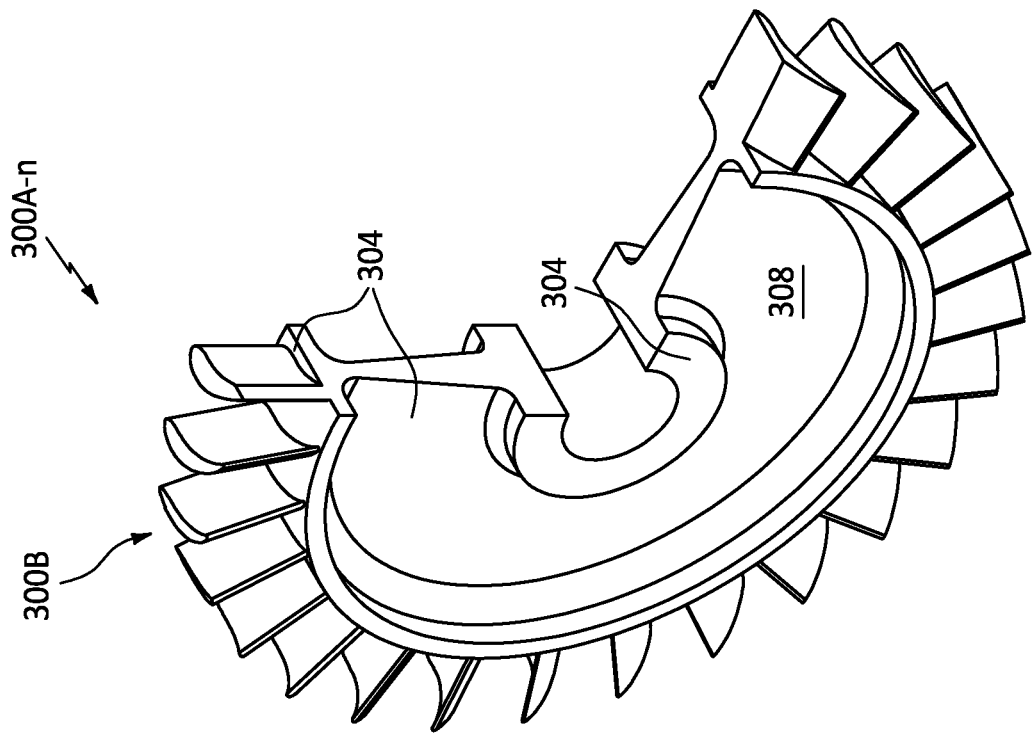
FIG. 6 illustrates perspective cutaway views of different exemplary CAD models having a common geometric feature, in accordance with one or more embodiments of the present disclosure.
Figure 6:
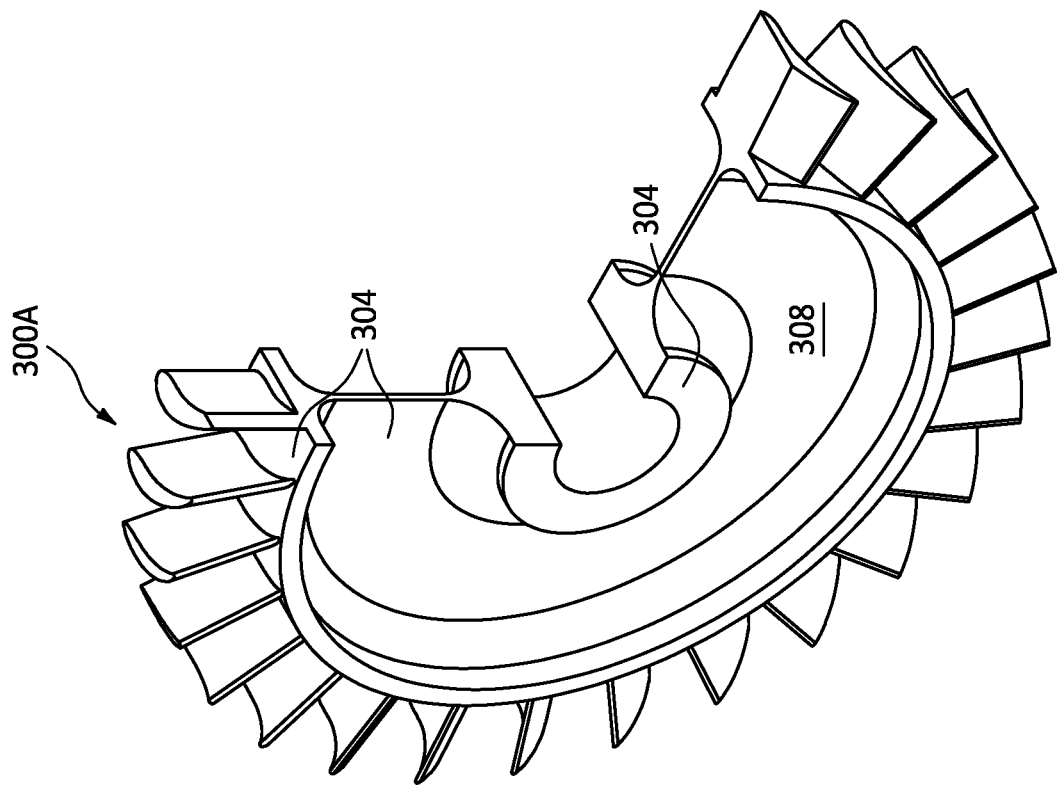

As shown in FIG. 6, each CAD model 300A-n (e.g., CAD models 300A, 300B representing bladed disks) of the plurality of different CAD models 300 includes at least one common geometric feature 308. In other words, at least one of the geometric features of the plurality of geometric features 304 for each CAD model 300A-n may be commonly included in all of the CAD models 300A-n of the plurality of different CAD models 300. As used herein, the term "common geometric feature" refers to a geometric feature (e.g., a surface) which is similar for each CAD model 300A-n of the plurality of different CAD models 300 based on one or more predetermined similarity rules. In some embodiments, the at least one common geometric feature 308 may include one or more geometric characteristics (e.g., diameter, thickness, etc.) which are the same or within a predetermined geometric characteristic range for each CAD model 300A-n of the plurality of different CAD models 300. In some embodiments, the at least one common geometric feature 308 may be additionally or alternatively determined based on a similar fit, form, function, position, tolerance, surface finish, etc. for each CAD model 300A-n of the plurality of different CAD models 300.

In some embodiments, step 202 may include indexing each common geometric feature 308 for the plurality of different CAD models 300. For example, in some embodiments, each common geometric feature 308 (e.g., a surface representation 306) may be assigned a unique identification code 310 where the common geometric feature 308 of each CAD model 300A-n of the plurality of different CAD models 300 has the unique identification code 310. Accordingly, a common geometric feature 308 for the plurality of different CAD models 300 may be associated with the unique identification code 310, for example, for digital traceability of the common geometric feature 308 throughout the plurality of different CAD models 300. Similarly, in some embodiments, a second common geometric feature 308 for the plurality of different CAD models 300 may be assigned a second unique identification code 310 which is different than the identification code for the common geometric feature 308 or any other common geometric feature 308. In some embodiments, geometric features other than the common geometric features 308 may be indexed, as described above. For example, some or all of the plurality of geometric features 304 (e.g., each surface) of a CAD model 300A-n may be assigned a unique identification code 310.

Figure 7:
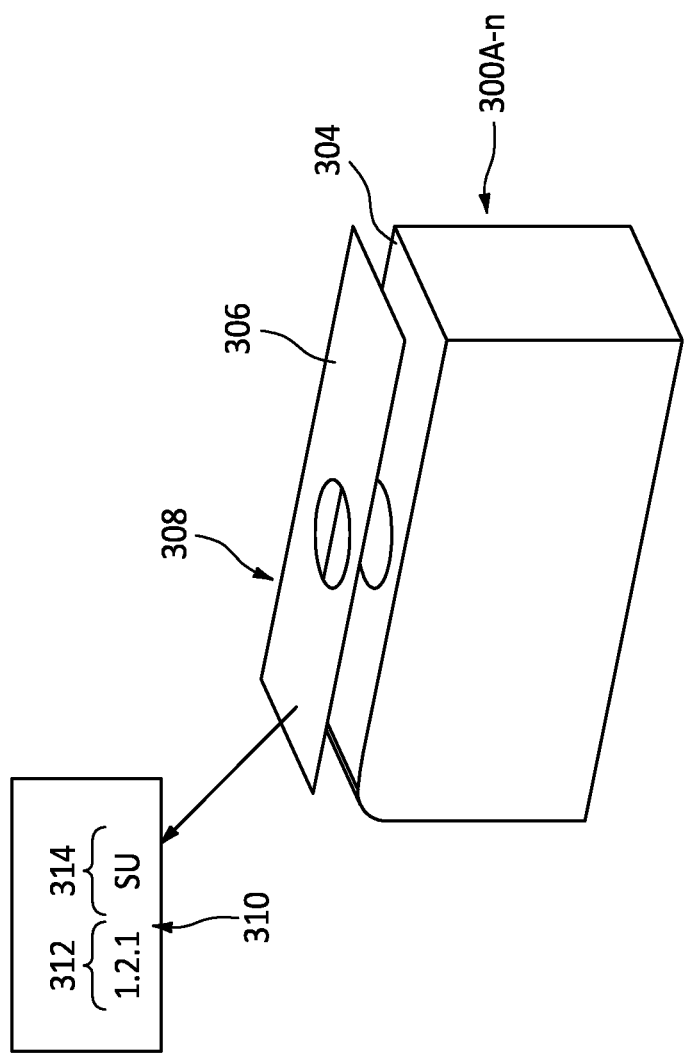
FIG. 7 illustrates a perspective view of an exemplary CAD model with a geometric feature defined by a surface representation extracted from a surface of the exemplary CAD model and including a unique identification code assigned to the geometric feature, in accordance with one or more embodiments of the present disclosure.

As shown, for example, in FIG. 7, the unique identification code 310 for an exemplary geometric feature 304 may include index number 312 and index code 314 elements which may be determined based on a predetermined coding nomenclature. For example, the index number 312 may be used to identify a logical or hierarchical relationship between elements of a component geometric feature, a component, a module, or a broader system or part including multiple components. The index code 314 may indicate a description or purpose for the geometric feature 304. However, the present disclosure is not limited to the above-described geometric feature coding framework and it is contemplated that other coding frameworks could be used such as, but not limited to, the Quality Information Framework (QIF) with Universally Unique Identifiers (UUID).

Referring to FIGS. 1-3, in some embodiments, the method 200 may include generating an inspection sequence 320 for each common geometric feature 308 for the plurality of different CAD models 300 (step 204). Accordingly, prior to the manufacture of components (e.g., components 302A-n) corresponding to the plurality of different CAD models 300, step 204 may include generating the inspection sequence 320 for inspecting the manufactured components 300A-n which verifies that the manufactured components 302A-n are likely to be acceptable and within specification limits. In some embodiments, the inspection sequence 320 may be stored in memory 24, the database 26 as shown in FIG. 3, or one or more external device 32 for use by the computer system 20. The inspection sequence 320 may include instructions for the operation of one or more inspection devices such as a coordinate-measuring machine. Component inspection devices or systems may be configured to collect raw data (e.g., a point cloud) from components 302A-n with different acquisition parameters such as speed, density, accuracy, etc. Component inspection devices or systems may be configured to manipulate the raw data to filter outlier data or noise collected during component inspection. However, the present disclosure is not limited to any particular component inspection device or system and the inspection sequence 320 may be directed to the use of automated, semi-automated, or manual (e.g., non-automated) inspection processes and systems.

In some embodiments, the inspection sequence 320 may include an inspection frequency for each common geometric feature 308. For example, the inspection sequence 320 may specify that 1 in 5, 1 in 10, 1 in 20, etc. instances of a component geometric feature 316 of the manufactured components 302A-n, corresponding with a particular common geometric feature 308 of the plurality of different CAD models 300, must be inspected. As used herein, the term "component geometric feature" refers to a geometric feature of a component 302A-n which corresponds to a particular common geometric feature 308 of the plurality of different CAD models 300. In some embodiments, the inspection sequence 320 may include instructions to measure or otherwise inspect one or more geometric characteristics 318 of the inspected component geometric feature 316 which may represent a dimension, shape, or other attribute of the inspected component geometric feature 316. The measured geometric characteristics 318 may be compared to predetermined geometric dimensioning and tolerancing (GD&T) data for the geometric characteristics 318 or to digital equivalent geometric characteristics 322 associated with the common geometric feature 308 and/or stored with the CAD models 300A-n or in the database 26, memory 24, or external devices 32. For example, the inspection sequence 320 may require verifying that a first geometric characteristic (e.g., a width) 318 of the component geometric feature is within a first tolerance and a second geometric characteristic (e.g., a length) of the component geometric feature is within a second tolerance. The inspection sequence 320 may require measurements between various discrete points of the component geometric feature 316. Thus, in contrast to conventional inspection plans which may apply to instances of a same manufactured component (e.g., 1 in every 5 of the component), the present disclosure inspection sequence 320 may be directed to an inspection of a component geometric feature 316 corresponding to a particular common geometric feature 308 of the plurality of different CAD models 300 which may be found on different manufactured components 302A-n.

Figure 8:
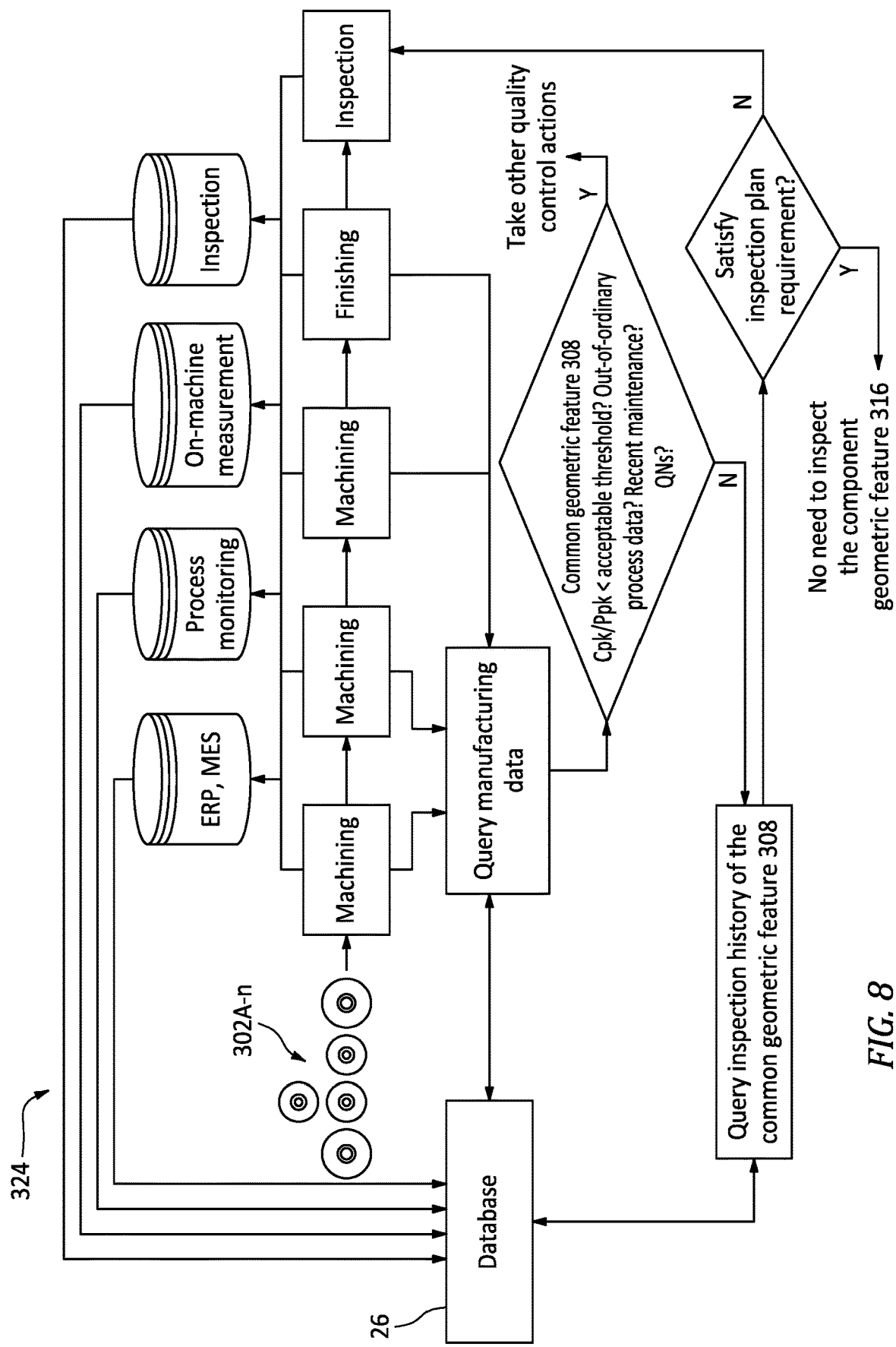
FIG. 8 illustrates a schematic block diagram of an exemplary manufacturing and inspection process, in accordance with one or more embodiments of the present disclosure.

Referring to FIGS. 1-3 and 8, the method 200 may include manufacturing the components 302A-n corresponding to the plurality of different CAD models 300 (step 206). As shown in FIG. 8, different components 302A-n may undergo a series of machining, finishing, and inspection steps during the manufacturing process. However, the present disclosure is not limited to the particular manufacturing process illustrated in FIG. 8 and the present disclosure method 200 may be applicable to other forms of manufacturing components such as, but not limited to, additive manufacturing, casting, injection molding, and the like. The different components 302A-n may be manufactured together in small batches of each particular component configuration (e.g., each part number). As described above, each of the different components 302A-n may include one or more component geometric features 316 corresponding to one or more respective common geometric features 308 of the plurality of different CAD models 300.

The method 200 may include collecting manufacturing data 324 for the at least one common geometric feature 308 of the plurality of different CAD models 300 (step 208). Component manufacturing data for each common geometric feature 308 may be collected during the manufacturing of each component 302A-n having the component geometric feature 316 corresponding to the common geometric feature 308. The component manufacturing data collected for a particular common geometric feature 308 may be maintained with the feature manufacturing data for the particular common geometric feature 308 which may include all of the previously collected manufacturing data for the particular common geometric feature 308 (generally referred to herein as manufacturing data 324). Manufacturing data 324 may include any useful data associated with the common geometric feature 308 which may be collected during manufacturing of the components 302A-n. The manufacturing data 324 may include enterprise resource planning (ERP) and/or manufacturing execution system (MES) data. The manufacturing data 324 may include process monitoring data, for example, spindle power, vibration, coolant temperature, voltages, machining tools used, machining tool history, actual manufacturing time for the component geometric feature 316 etc. The manufacturing data 324 may include on-machine measurements of various geometric characteristics of the common geometric feature 308 which may be measured/probed during various manufacturing steps. The manufacturing data 324 include inspection data of the component geometric feature 316 for completed components 302A-n as well as the number of inspections performed for the particular component geometric feature 316 and acceptance rates for the component geometric feature 316.

Step 208 may further include storing the manufacturing data 324. The manufacturing data 324 associated with each common geometric feature 308 may be stored as a separate dataset 326, for example, in the database 26 as shown in FIG. 3, memory 24, the one or more external devices 32, or any other suitable data storage medium. The dataset 326 may be assigned the same unique identification code 310 as the common geometric feature 308 having manufacturing data 324 in the dataset 326. Accordingly, the dataset 326 and the common geometric feature 308 may be linked in the CAD environment by the unique identification code 310.

The method 200 may include analyzing the manufacturing data 324 (step 210). Step 210 may include analyzing the manufacturing data 324 collected during manufacturing of the component geometric feature 316 of one or more components 302A-n to determine whether there have been any abnormal deviations in the manufacturing of the components 302A-n. In the event that an abnormal deviation is detected in the manufacturing data 324 for the component geometric feature 316, step 210 may include, for example, inspecting the components 302A-n for which an abnormal deviation has been detected, inspecting the manufacturing process, and/or inspecting the manufacturing data collection process. Process and on-machine measurement data collected during the manufacturing of the component geometric feature 316 for a current component 300A-n may be compared with the data collected for the component geometric feature 316 of other previously manufactured components 302A-n to determine whether the process data or on-machine measurement data is normal or abnormal (e.g., an abnormal deviation) for the component geometric feature 316 of the current component 302A-n. Manufacturing data 324 may additionally be queried to determine whether there has been recent maintenance to manufacturing equipment or whether there are quality notice ("QN") records for the common geometric feature 308 associated with the component geometric feature 316 of the current component 302A-n. Step 210 may include retrieving the inspection history data of the manufacturing data 324 for the component geometric feature 316 and comparing the inspection history data to the inspection sequence 320 for the component geometric feature 316 to determine whether an inspection is due to be performed for the component geometric feature 316 of a component 302A-n based on an inspection frequency required by the inspection sequence 320. Accordingly, step 210 may include determining whether at least one component geometric feature 316 of a component 302A-n should be inspected.

In some embodiments, step 210 may include querying the manufacturing data 324 associated with a common geometric feature 308 to determine a process capability (Cpk) and/or a process performance (Ppk) for that common geometric feature 308. The Cpk is a statistical tool which may be used to measure the ability of a manufacturing process to produce components or component geometric features within specification limits with a high confidence. Ppk is another statistical tool which may be used to determine how the actual manufacturing process has performed over a period of time with respect to producing components or component geometric features within specification limits with a high confidence. For example, a Cpk or Ppk value of 1.33 for a particular common geometric feature 308 may indicate that 99.99% of instances of a corresponding component geometric feature 316 are within or likely to be within specification limits, a Cpk or Ppk value of 1.2 for a particular common geometric feature 308 may indicate that 99.97% of instances of a corresponding component geometric feature 316 are within or likely to be within specification limits, a Cpk or Ppk value of 1.0 for a particular common geometric feature 308 may indicate that 99.7% of instances of a corresponding component geometric feature 316 are within or likely to be within specification limits, etc. The Cpk or Ppk value may be determined by querying and analyzing the inspection results associated with the common geometric feature 308 for a number (e.g., 10, 25, 50, etc.) of recently manufactured components 302A-n.

The method 200 may include modifying the inspection sequence 320 for a common geometric feature 308 of the plurality of different CAD models 300 based on the analyzed manufacturing data 324 for the common geometric feature 308 (step 212). In some embodiments, step 212 may include determining the Cpk and/or Ppk value for a common geometric feature 308 relative to a first Cpk and/or Ppk threshold. If the Cpk and/or Ppk value for the common geometric feature 308 is at or above the first Cpk and/or Ppk threshold, the inspection frequency for the component geometric feature 316 associated with the common geometric feature 308 may be reduced (e.g., the percentage of inspected component geometric features 316 may be reduced). Additionally, or alternatively, if the Cpk and/or Ppk value for the common geometric feature 308 is at or above the first Cpk and/or Ppk threshold, the number of geometric characteristics 318 required to be inspected by the inspection sequence 320 may be decreased. The first Cpk and/or Ppk threshold may have a value of 1.33, for example, however, the value of the first Cpk and/or Ppk threshold may be higher or lower depending on a number of manufacturing considerations such as the type of manufacturing process, the type of component, etc. In some embodiments, step 212 may include determining the Cpk and/or Ppk value for a common geometric feature 308 relative to a second Cpk and/or Ppk threshold having a value which is less than a value of the first Cpk and/or Ppk threshold. If the Cpk and/or Ppk value for the common geometric feature 308 is at or above the second Cpk and/or Ppk threshold, the inspection frequency and/or the number of inspected geometric characteristics 318 required by the inspection sequence 320 may be maintained. If the Cpk and/or Ppk value for the common geometric feature 308 is below the second Cpk and/or Ppk threshold, the inspection frequency and/or the number of inspected geometric characteristics 318 required by the inspection sequence 320 may be increased.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A method for inspecting components, the method comprising:
   providing a plurality of different three-dimensional component CAD models, each three-dimensional component CAD model of the plurality of different three-dimensional component CAD models sharing at least one common geometric feature, and each three-dimensional component CAD model of the plurality of different three-dimensional component CAD models is different than each other three-dimensional component CAD model of the plurality of different three-dimensional component CAD models for at least one geometric feature of the each three-dimensional component CAD model;
   generating an inspection sequence for the at least one common geometric feature;
   collecting feature manufacturing data for the at least one common geometric feature during manufacturing of a plurality of different components corresponding to the respective plurality of different three-dimensional component CAD models;
   analyzing the feature manufacturing data associated with the at least one common geometric feature;
   modifying the inspection sequence for the at least one common geometric feature based on the analyzed feature manufacturing data; and
   inspecting components based on the modified inspection sequence.

2. The method of claim 1, wherein the at least one common geometric feature includes at least one geometric characteristic and wherein the inspection sequence for the at least one common geometric feature includes measuring the at least one geometric characteristic.

3. The method of claim 2, wherein the at least one geometric characteristic includes a dimension of the at least one common geometric feature.

4. The method of claim 1, wherein the at least one common geometric feature is a surface.

5. The method of claim 1, wherein the inspection sequence includes an inspection frequency and a number of inspection measurements for the at least one common geometric feature.

6. The method of claim 5, wherein the step of analyzing the feature manufacturing data includes determining one or both of a process capability (Cpk) and a process performance (Ppk) for the at least one common geometric feature.

7. The method of claim 6, wherein the step of modifying the inspection sequence includes:
   identifying the one or both of the Cpk and the Ppk is greater than a predetermined threshold value; and
   reducing the inspection frequency for the at least one common geometric feature based on the identification of the one or both of the Cpk and the Ppk greater than the predetermined threshold value.

8. The method of claim 6, wherein the step of modifying the inspection sequence includes:
   identifying the one or both of the Cpk and the Ppk is greater than a predetermined threshold value; and
   reducing the number of inspection measurements for the at least one common geometric feature based on the identification of the one or both of the Cpk and the Ppk greater than the predetermined threshold value.

9. The method of claim 1, further comprising indexing the at least one common geometric feature by assigning the at least one common geometric feature a unique identification code identifying the at least one common geometric feature in each three-dimensional component CAD model of the plurality of different three-dimensional component CAD models sharing the at least one common geometric feature.

10. The method of claim 9, further comprising storing the feature manufacturing data associated with the at least one common geometric feature as a dataset in a database and assigning the unique identification code to the dataset.

11. The method of claim 10, wherein the feature manufacturing data includes an inspection history of the at least one common geometric feature.

12. A system for inspecting components, the system comprising:
   a processor;
   a database in signal communication with the processor; and memory in signal communication with the processor, the memory containing instructions recorded therein which, when executed by the processor, cause the processor to:
    collect component manufacturing data for at least one common geometric feature during manufacturing of a component, the component corresponding to a three-dimensional component CAD model which is one of a plurality of different three-dimensional component CAD models in the database sharing the at least one common geometric feature;
    analyze the component manufacturing data;
    modify an inspection frequency for an inspection sequence for the at least one common geometric feature based on the analyzed feature manufacturing data;
    retrieve an inspection history of the at least one common geometric feature from the database;
    determine whether at least one component geometric feature of the component, corresponding to the respective at least one common geometric feature, should be inspected based on the inspection history and the modified inspection frequency; and
    inspect the at least one component geometric feature corresponding to the respective at least one common geometric feature based on the determination that the at least one component geometric feature should be inspected.

13. The system of claim 12, wherein analyzing the component manufacturing data includes determining whether the component manufacturing data includes an abnormal deviation.

14. The system of claim 13, wherein the at least one common geometric feature has a unique identification code.

15. The system of claim 14, wherein the memory contains instructions recorded therein which, when executed by the processor, further cause the processor to:
    store the component manufacturing data with feature manufacturing data which is stored as a dataset in the database, wherein the feature manufacturing data includes the inspection history and the dataset has the unique identification code.

16. The system of claim 12, wherein the memory contains instructions recorded therein which, when executed by the processor, further cause the processor to:
    compare the inspection history to an inspection sequence for the at least one common geometric feature.

17. A method for inspecting components, the method comprising:
    manufacturing a component, the component corresponding to a three-dimensional component CAD model which is one of a plurality of different three-dimensional component CAD models sharing at least one common geometric feature;
    collecting component manufacturing data for the at least one common geometric feature during manufacturing of the component;
    analyzing the component manufacturing data;
    modifying an inspection frequency for an inspection sequence for the at least one common geometric feature based on the analyzed feature manufacturing data;
    retrieving an inspection history of the at least one common geometric feature;
    determining whether at least one component geometric feature of the component, corresponding to the respective at least one common geometric feature, should be or should not be inspected based on the inspection history and the modified inspection frequency; and
    inspecting the at least one component geometric feature corresponding to the respective at least one common geometric feature based on the determination that the at least one component geometric feature should be inspected.

18. The method of claim 17, wherein the step of analyzing the component manufacturing data includes determining whether the component manufacturing data includes an abnormal deviation.

19. The method of claim 17, further comprising comparing the inspection history to an inspection sequence for the at least one common geometric feature.

20. The method of claim 17, wherein the at least one common geometric feature has a unique identification code, the method further comprising storing the component manufacturing data with feature manufacturing data as a dataset in a database, wherein the feature manufacturing data includes the inspection history and the dataset has the unique identification code.

* * * * *